United States Patent Office 3,088,789
Patented May 7, 1963

3,088,789
DIAZOAMINO COMPOUNDS AND PROCESS FOR THE PRODUCTION OF ICE COLORS IN TEXTILE PRINTING
Kurt Breig and Heinz Gutjahr, Cologne-Stammheim, Germany, assignors to Farbenfabriken Bayer Aktiengesellschaft, Leverkusen, Germany, a corporation of Germany
No Drawing. Filed July 7, 1959, Ser. No. 825,424
Claims priority, application Germany July 9, 1958
6 Claims. (Cl. 8—45)

The present invention relates to a process for the production of azoic dyestuffs in textile printing, employing diazoamino compounds and ice color coupling components and developing the dyestuffs with neutral steam.

It is an object of the invention to use in the above said process diazoamino compounds of the following general formula:

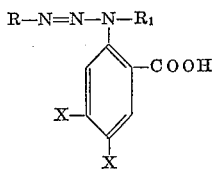

In this formula one X is hydrogen and the other X is $SO_2R_3$, R stands for the radical of a diazo compound, particularly of the benzene series, $R_1$ means a lower alkyl, a benzyl or a cyclohexyl radical and $R_3$ denotes a lower alkyl, a benzyl or a cyclohexyl radical, or stands for a substituent —NH-lower alkyl, —NH-hydroxy lower alkyl, —NH-chloro substituted lower alkyl, —NH-benzyl, —NH-cyclohexyl, —N-(hydroxy lower alkyl)$_2$, —N-(chloro substituted lower alkyl)$_2$ lower alkyl-N-hydroxy lower alkyl
| lower alkyl-N-chloro substituted lower alkyl
| hydroxy lower alkyl-N-chloro substituted lower alkyl
|

—NH-allyl or —N⟨X wherein X stands for bivalent 4 or 5 membered bridging groups, such as piperidine and morpholine. The term lower alkyl is intended to cover, for example, alkyl radicals having 1 to 6 carbon atoms and isoalkyl radicals containing 3 to 6 carbon atoms.

It is another object of the invention to provide novel diazoamino compounds of the following formula:

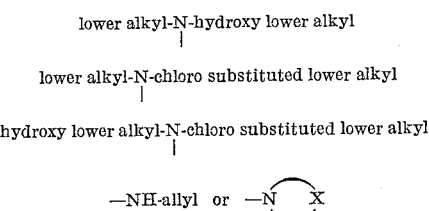

which may be used in the above said process for the production of ice colors. In the latter formula one Y is $SO_2R_2$ and the other Y is hydrogen, R and $R_1$ have the same meaning as mentioned above and $R_2$ means a lower alkyl, benzyl or cyclohexyl radical; the term lower alkyl has the same meaning as indicated above.

A further object is the provision of novel stabilizers of the benzene series which are to be used for the preparation of diazoamino compounds and which correspond to the formula

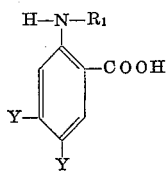

wherein $R_1$ and Y have the same meaning as mentioned above.

In accordance with this invention it has been found that diazoamino compounds of the following formula

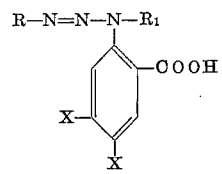

wherein R, $R_1$ and X have the above mentioned meaning, can be developed with neutral steam, i.e. without any addition of free acids or acid yielding agents, according to known methods in the presence of ice color coupling components. Deep and strong prints are thus obtainable on cellulose materials such as cotton and regenerated cellulose; also very good fixation on spun rayon can be obtained.

In spite of the ready ability to split up in neutral steam, the printing pastes, obtained from diazoamino compounds of the above formula, ice color coupling components, thickening agents and alkalies, possess a surprisingly good stability.

The splitting of the diazoamino compounds is effected according to the invention on the materials without addition of acid-yielding or alkali-binding agents. An additional use of volatile bases containing hydroxy groups is also not necessary. The production of printing pastes and printing of textile materials is carried out according to conventional processes. The prints do not show any noticeable loss in depth of color when printed together with vat dyestuffs. Alkalies as well as reducing agents from vat printing pastes have, therefore, no detrimental influence on the development of the dyestuffs. Furthermore, it should be noted that the compositions from diazoamino compounds and ice color coupling components used according to the process of the invention do not decrease in their intensity in multi-color printing by the action of the interposed rollers.

According to this invention is has further been found that valuable new diazoamino compounds which may be employed in the above said process are obtainable by combining in known manner compounds of the following composition

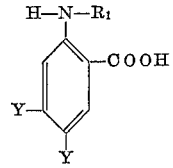

wherein $R_1$ and Y have the same meaning as indicated above, with diazo compounds suitable for the production of ice colors. The term diazo compounds includes diazo compounds derived from diamines, i.e. those amines which can be diazotized twice.

As diazo compounds suitable for the production of ice colors those of the benzene series are preferably used, especially aniline, and anilines substituted by halogen atoms, alkyl-, alkoxy-, nitro-, sulfonyl-, sulfonamido- or trifluoro-methyl groups, possibly containing more than one of these substituents in the radical. Of the tetrazo components customarily used for this purpose, di-anisidine should be noted in the first place.

Compounds to be used as stabilizers having the formula

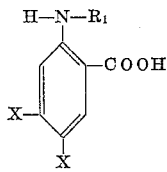

wherein $R_1$ and X have the aforesaid significance, are obtainable according to known processes, for example, by sulfochlorinating 2-halobenzene-1-carboxylic acid, and in case of the production of sulfonamides, reacting the sulfochloride group with the suitable amines or, in case of preparing the sulfones, reducing the sulfochloride group to give the sulfinic acid group and converting the latter into the corresponding sulfone by the reaction with a compound containing a labile halogen atom. By reacting the halogen in the o-position to the carboxyl group with ammonia, primary amines are obtained which may be converted into the secondary amines used according to the invention by a further reaction with compounds containing a labile halogen atom such as monochloro-acetic acid. Amines of this type may also be obtained by exchanging the halogen atom in the o-position to the carboxyl group by primary amines.

As alkyl radicals $R_1$ in the stabilizers low-molecular alkyl groups with 1 to 5 carbon atoms may generally be used. Examples of substituted alkyl radicals are the groupings —$CH_2COOH$, —$CH_2CONH_2$, —$CH_2SO_3H$, —$CH_2COOC_2H_5$ or

(Y denoting a hydrocarbon radical).

Low-molecular groups containing 1 to 5 carbon atoms are likewise preferred as alkyl, halo-alkyl and hydroxy-alkyl radicals in the amino group $R_3$ of the above general formula. As radicals

the piperidide and morpholide radical may be considered, for example.

The reaction of the diazo or tetrazo compounds with the stabilizing amines is carried out in a manner known as such in a non-acid, preferably in an alkaline, medium. The diazoamino compounds obtained are advantageously separated from the reaction mixture by the addition of common salt or of alkali metal hydroxide or of a mixture of common salt and alkali metal hydroxide. The diazoamino compounds may also be isolated according to the known processes of spray-drying, or by separation in the form of alkaline earth metal salts.

Suitable ice color coupling components are, for example, those of the 2,3-hydroxynaphthoic acid-arylide, acetoacetylamino - arylide, hydroxycarbazole - carboxylic acid-arylamide or hydroxldiphenylene-hydroxycarboxylic acid-arylamide series.

The following examples are given for the purpose of illustrating the invention without, however, limiting it thereto.

*Example 1*

0.5 mol of diazotized 1-amino-2-methyl-5-chlorobenzene together with a dilute sodium carbonate solution are run with good stirring into a weakly soda-alkaline solution of 0.6 mol of 2-methyl-aminobenzene-1-carboxylic acid-5-sulfonic acid-methylamide so that the solution has a constant weakly soda-alkaline reaction. After stirring for 1 hour, the coupling is completed. By proportional addition of 20 percent sodium chloride calculated on the volume of the coupling solution, the diazoamino compound can be salted out into a solid state.

60 g. of a mixture of equivalent parts of the diazoamino compound thus obtained and 1-(2′,3′-hydroxynaphthoylamino)-2-ethoxybenzene are dissolved in 30–50 ml. of alcohol or another solvent and 8–10 g. of sodium hydroxide solution (38° Bé.) in approximately 300 ml. of water and made up with water to 1000 g. after stirring in 500 g. of thickening such as starch tragacanth alginate thickening or cellulose ether thickening. Fabrics of cotton or regenerated cellulose are printed with this printing paste. After drying the printed fabric, it is steamed with neutral steam for about 5–10 minutes, whereby the dyestuff is developed. After boiling with soap and removal of the thickening, the fabric is rinsed and dried. A bright scarlet shade of very good fastness to light is obtained.

If the 1-(2′,3′-hydroxynaphthoylamino)-2-ethoxybenzene is replaced in this printing paste by 1-(2′,3′-hydroxynaphthoylamino)-2-methylbenezene, a full bloomy red shade is obtained.

The printing pastes show a very good stability at temperatures up to 40° C.

The 2-methylaminobenzene-1-carboxylic acid-5-sulfonic acid-methylamide (M.P. 210–211° C.) may be prepared as follows: cold 2-chlorobenzene-1-carboxylic acid-5-sulfonic acid chloride is reacted with an aqueous methylamine solution. In order to replace the chlorine in the o-position to the carboxylic acid group by the methylamino group, the compound is reacted at 125° C. in an autoclave with an excess of methylamine in the presence of copper salts in known manner.

In a similar manner there is obtained, for example, 2-methylaminobenzene-1-carboxylic acid-5-sulfonic acid-(N-hydroxyethyl)-methylamide (M.P. 221–222° C.) or 2-methylaminobenzene-1-carboxylic acid-5-sulfonic acid-di-(hydroxyethyl)-amide (M.P. 189–190° C.). Both amines yield, when coupled with diazotized 1-amino-2-methyl-5-chlorobenzene, diazoamino compounds which are readily splittable by neutral steaming. Their stability in the printing paste is very good even at temperatures up to 40° C.

*Example 2*

When the diazoamino compound is used according to Example 1, obtained from 1-amino-2-methyl-4,5-dichlorobenzene and 2-methylaminobenzene-1-carboxylic acid-5-sulfonic acid methylamide, there are obtained (a) with 1-(2′,3′-hydroxynaphthoylamino) - 2 - methoxybenzene a bright bluish red shade, and (b) with 1-(2′,3′-hydroxynaphthoylamino)-2-ethoxybenzene a bright scarlet shade.

In the place of 2-methylaminobenzene-1-carboxylic acid-5-sulfonic acid-methylamide, there may also be used 2-methylaminobenzene-1-carboxylic acid-5-sulfonic acid-(N-hydroxyethyl)-methylamide or 2-methylaminobenzene-1-carboxylic acid-5-sulfonic acid-di-(hydroxyethyl)-amide.

*Example 3*

When according to Example 1 the diazoamino compound is used obtained from 1-amino-2-methoxy-4-nitrobenzene and 2-isobutylaminobenzene-1-carboxylic acid-5-sulfonic acid-methylamide, there is obtained with 1-(2′,3′-hydroxy-naphthoylamino)-naphthalene as coupling component and using 8–15 g. of a sodium hydroxide solution (38° Bé) per kilogram of printing paste, an intense Bordeaux shade by neutral steaming. 2-isobutylaminobenzene-1-carboxylic acid-5-sulfonic acid-methylamide (M.P. 255–256° C.) can be prepared in analogous manner to that indicated in Example 1 for 2-methylaminobenzene-1-carboxylic acid-5-sulfonic acid-methylamide.

Instead of 2-isobutylaminobenzene-1-carboxylic acid-5-sulfonic acid-methylamide, there may also be used 2-isobutylaminobenzene-1-carboxylic acid-5-sulfonic acid-(N-hydroxyethyl)-methylamide.

*Example 4*

When the diazoamino compound obtained from 1-amino-2-methyl-4-nitrobenzene and 2-isobutylaminobenzene-1-carboxylic acid-5-sulfonic acid-methylamide is used according to Example 3 a bright Bordeaux shade is obtained with 1-(2′,3′-hydroxy-naphthoylamino)-2-methylbenzene.

*Example 5*

A printing paste prepared according to the instructions of Example 1 and containing the diazoamino compound from 1-amino-2-methyl-4-chlorobenzene and 2-methylaminobenzene-1-carboxylic acid-5-sulfonic acid-(N-hydroxyethyl)-methylamide and 1-acetoacetylamino-4-chloro-2,5-dimethoxybenzene as coupling component, yields, when developed neutral, a bright greenish yellow shade.

*Example 6*

0.5 mol of diazotized 1-amino-2-methyl-5-chlorobenzene are run with good stirring into a weakly soda-alkaline solution of 0.6 mol of 2-methylaminobenzene-1-carboxylic acid-5-ethylsulfone, keeping the coupling solution neutral by a continuous addition of sodium carbonate. After stirring for 2 hours, the coupling is completed. The solution is clarified and treated with 20 percent of common salt. The product thus precipitates and can be filtered off with suction after stirring over night.

60 g. of a mixture of equivalent parts of the above diazoamino compound and 1-(2′,3′-hydroxy-naphthoylamino)-2-ethoxybenzene are dissolved with 50 ml. of alcohol or another suitable solvent and 5–15 g. of sodium hydroxide solution (38° Bé.) in approximately 300 ml. of water, stirred into 500 g. of thickening and made up with water to 1000 g. This printing paste is printed on cotton or regenerated cellulose. After drying, the printed fabric is steamed with neutral steam for about 5–10 minutes, the dyestuff thus being developed. After soaping at boiling temperature and the customary removal of the thickening, the fabric is rinsed and dried. A bright scarlet is obtained which is very fast to light.

When in the above printing paste the 1-(2′,3′-hydroxy-naphthoylamino)-2-ethoxybenzene is replaced by 1-(2′,3′-hydroxy-naphthoylamino)-2-methylbenzene, a full bloomy red is obtained.

The printing pastes show a very good stability even at temperatures up to 40° C.

2-methylaminobenzene-1-carboxylic acid-5-ethylsulfone may be prepared as follows: 1 part by weight of 2-chlorobenzene-1-carboxylic acid is heated to 85–90° C. for ten hours with 6 parts by weight of chlorosulfonic acid, and the reaction mixture is then poured onto ice. After suction-filtration, the sulfochloride is obtained in a pure state (M.P. 147–149° C.). 1 mol of the sulfochloride is then reduced in known manner with 1.2 mols. of sodium sulfite in an aqueous phenolphthalein-alkaline solution to give the sulfinic acid (M.P. 209–210° C.). By reaction with ethyl bromide, the sulfone (M.P. 154–155° C.) is obtained. To replace the chlorine in o-position to the carboxylic acid group by the methylamino group, the compound is reacted in known manner at about 125° C. in an autoclave with an excess of methylamine in the presence of copper salts. The reaction product is separated by acidification (M.P. 178–180° C.).

*Example 7*

When the diazoamido compound obtained from 1-amino-2-methyl-4,5-dichlorobenzene and 2-methylaminobenzene-1-carboxylic acid-5-ethylsulfone is used according to Example 6, there are obtained (a) with 1-(2′,3′-hydroxy-naphthoylamino)-2-ethoxybenzene a bright scarlet, and (b) with 1-(2′,3′hydroxy-naphthoylamino)-2-methoxybenzene a bright bluish red.

*Example 8*

When the diazoamino compound obtained from 1-amino-2-methyl-4-chlorobenzene and 2-methylaminobenzene-1-carboxylic acid-5-ethylsulfone is used according to Example 6, a bright greenish yellow is obtained on cotton and spun rayon with 1-acetoacetylamino-4-chloro-2,5-dimethoxybenzene.

In analogy to the above examples, for instance, the following combinations may also be made:

| Diazo component | Stabilizing amine | Ice color coupling component | Shade |
|---|---|---|---|
| 1-amino 2-methoxy-4-nitrobenzene | 2-isopropylaminobenzene-1-carboxylicacid-5-sulfonicacidmethylamide (M.P. 235–236°). | 1-(2′,3′-hydroxynaphthoylamino)-naphthalene. | Bordeaux. |
| Do | 2-isopropylamino-1-carboxylicacid-5-sulfonicacid-di-hydroxy-ethylamide (M.P. 144–146°). | do | Do. |
| Do | 2-isopropylaminobenzene-1-carboxylicacid-5-sulfonicacid-(N-hydroxyethyl)-methylamide (M.P. 184–185°). | do | Do. |
| 1-amino-2-methyl-4-nitrobenzene | 2-isopropylaminobenzene-1-carboxylicacid-5-sulfonicacid-methylamide. | 1-(2′,3′-hydroxynaphthoylamino)-2-methylbenzene. | Do. |
| Do | 2-isopropylaminobenzene-1-carboxylicacid-5-sulfonicacid-di-hydroxyethylamide. | do | Do. |
| Do | 2-isopropylaminobenzene-1-carboxylicacid-5-sulfonicacid-(N-hydroxyethyl)-methylamide. | do | Do. |
| o-Chloro-aniline | 2-isobutylaminobenzene-1-carboxylicacid-5-sulfonicacid-methylamide. | Condensation product of 17,4 parts by weight of copper-phthalocyanine-(3,3′,3″)-trisulfochloride and 10,2 parts by weight of 1-(4′-aminophenyl)-3-methylpyrazolone-(5). | Very bright green. |
| 1-amino-2-methoxy-5-chloro-benzene | 2-methylaminobenzene-1-carboxylicacid-5-sulfonic-acid-methylamide | 2-hydroxy-carbazole-3-carboxylic-acid-4′-chloro-anilide | Brown. |
| Do | 2-methylaminobenzene-1-carboxylicacid-5-sulfonic-acid-allyl-amide (m.p. 219–220°) | do | Do. |
| Do | 2-methylaminobenzene-1-carboxylicacid-5-sulfonic-acid-morpholide (m.p. 235–236°) | do | Do. |
| 1-amino-2-methyl-5-chloro-benzene | Phenylglycine-2-carboxylic-acid-4-sulfonic-acid-(N-hydroxyethyl)-methyl-amide (m.p. 204–205°) | 1-(2′,3′-hydroxynaphthoyl-amino)-2-ethoxy-benzene | Scarlet. |
| Do | Phenylglycine-2-carboxylic-acid-4-sulfonic-acid-di-hydroxyethylamide (m.p. 240–241°) | do | Do. |
| Do | Phenylglycine-2-carboxylic-acid-4-sulfonic-acid-methylamide (M.P. 273–275°) | do | Do. |
| 1-amino-2-methoxy-benzene-5-carboxylic-acid-amide | 2-methylaminobenzene-1-carboxylicacid-5-sulfonic-acid-methylamide | 1-(2′,3′-hydroxynaphthoyl-amino)-naphthalene | Bluish red. |
| Do | Phenylglycine-2-carboxylic-acid-4-sulfonic-acid-(N-hydroxyethyl)-methylamide | do | Do. |

| Diazo component | Stabilizing amine | Ice color coupling component | Shade |
|---|---|---|---|
| 4-methoxy-3-aminobenzoyl-urea | 2-methylaminobenzene-1-carboxylicacid-5-sulfonic-acid-methylamide | 1-(2',3'-hydroxynaphthoylamino)-2,4-dimethoxy-5-chloro-benzene | Do. |
| Do | 2-methylaminobenzene-1-carboxylicacid-5-sulfonic-acid-di-hydroxyethyl-amide | do | Do. |
| 1-amino-2-methyl-5-chloro-benzene | 2-methylaminobenzene-1-carboxylicacid-5-methyl-sulfone | 1-(2',3'-hydroxynaphthoylamino)-2-ethoxybenzene | Scarlet. |
| Do | Phenylglycine-2-carboxylic-acid-4-methyl-sulfone (M.P. 280–283°) | do | Do. |
| 1-amino-2-methyl-4,5-dichloro-benzene | 2-methylaminobenzene-1-carboxylicacid-5-methyl-sulfone | 1-(2',3'-hydroxynaphthoylamino)-2-methoxy-benzene | Red. |
| Do | Phenylglycine-2-carboxylic-acid-4-methyl-sulfone | do | Red. |

What is claimed is:

1. In the process for producing azoic dyestuffs on cellulose textile materials with diazoamino compounds and ice color coupling components and developing the dyestuff with neutral steam, the improvement which consists in employing as diazoamino compound a compound of the following formula:

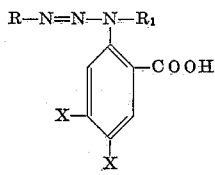

wherein one X is $SO_2R_3$ and the other X is hydrogen, R stands for the radical of a diazo compound selected from the group consisting of mono-chloro-toluidines, dichloro-toluidines, nitro-anisidines, nitro-toluidines, mono-chloro-anilines, mono-chloro-anisidines, and anisidine carboxylic acid amides, $R_1$ means a radical selected from the group consisting of lower alkyl, —$CH_2COOH$, benzyl and cyclohexyl, and $R_3$ stands for a member selected from the group consisting of lower alkyl, benzyl, cyclohexyl, —NH-lower alkyl, —NH-hydroxy lower alkyl, —NH-chloro substituted lower alkyl, —NH-benzyl, —NH-cyclohexyl, —N-(hydroxy lower alkyl)$_2$, —N-(chloro substituted lower alkyl)$_2$ lower alkyl-N-hydroxy lower alkyl
| lower alkyl-N-chloro substituted lower alkyl
| hydroxy lower alkyl-N-chloro substituted lower alkyl
|

—NH-allyl, piperidino and morpholino

2. Process according to claim 1 wherein in the general formula R is a radical of benzene series, $R_1$ is a lower alkyl group and $R_3$ is a NH-lower alkyl group.

3. Process according to claim 1 wherein in the general formula R is a radical of the benzene series, $R_1$ is a lower alkyl radical and $R_3$ is a lower alkyl-N-lower hydroxy alkyl group
|

4. A diazoamino compound of the following formula:

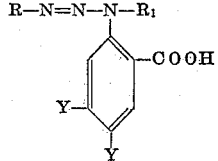

wherein one Y is $SO_2R_2$ and the other Y is hydrogen, R is a radical of a diazo compound selected from the group consisting of mono-chloro-toluidines, dichloro-toluidines, nitro-anisidines, nitro-toluidines, mono-chloro-anilines, mono-chloro-anisidines, and anisidine carboxylic acid amides, $R_1$ stands for a radical selected from the group consisting of lower alkyl, —$CH_2COOH$, benzyl and cyclohexyl and $R_2$ stands for a member selected from the group consisting of lower alkyl, benzyl and cyclohexyl.

5. A diazoamino compound according to claim 4 wherein R is a radical of the benzene series.

6. A compound having the general formula:

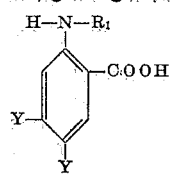

wherein $R_1$ stands for a radical selected from the group consisting of lower alkyl, —$CH_2COOH$, benzyl and cyclohexyl and $R_2$ stands for a member selected from the group consisting of lower alkyl, benzyl and cyclohexyl.

References Cited in the file of this patent

UNITED STATES PATENTS

| 2,758,001 | Glietenberg et al. | Aug. 7, 1956 |
| 2,815,259 | Glietenberg et al. | Dec. 3, 1957 |

FOREIGN PATENTS

| 44,229 | Netherlands | Oct. 15, 1938 |
| 883,753 | Germany | July 20, 1953 |
| 184,566 | France | Feb. 9, 1959 |